United States Patent [19]
Tokunaga et al.

[11] Patent Number: 5,885,740
[45] Date of Patent: Mar. 23, 1999

[54] MAGNETITE PARTICLES, A PROCESS FOR PRODUCING THEM AND APPLICATIONS THEREOF

[75] Inventors: Hideaki Tokunaga; Akira Nakamura; Tetsuyuki Wada, all of Yamaguchi-ken, Japan

[73] Assignee: Titan Kogyo Kabushiki Kaisha, Yamaguchi-ken, Japan

[21] Appl. No.: 938,849

[22] Filed: Sep. 26, 1997

[30] Foreign Application Priority Data

Sep. 27, 1996 [JP] Japan ................................. 8-277333

[51] Int. Cl.$^6$ ............................ G03G 9/107; C01G 49/02
[52] U.S. Cl. ........................................ 430/106.6; 252/62.56
[58] Field of Search ..................... 430/106.6; 252/62.56, 252/62.58

[56] References Cited

U.S. PATENT DOCUMENTS

| 3,652,334 | 3/1972 | Abeck et al. ............................ 117/236 |
| 5,512,194 | 4/1996 | Ogasawara et al. ................. 252/62.56 |
| 5,733,471 | 3/1998 | Hashiuchi et al. .................. 252/62.56 |

FOREIGN PATENT DOCUMENTS

| 0 566 790 | 10/1993 | European Pat. Off. . |
| 2 353 619 | 12/1977 | France . |
| 3925546 | 7/1962 | Japan ..................... 15/27 F |
| 58002226 | 6/1981 | Japan . |
| 58-25202 | 2/1983 | Japan ................. H01F 1/11 |
| 60-46525 | 10/1985 | Japan ................. H01F 1/11 |
| 3-9045 | 2/1991 | Japan ............... C01G 49/08 |
| 05043253 | 8/1991 | Japan . |
| 3-201509 | 9/1991 | Japan ................. H01F 1/02 |
| 5-18766 | 3/1993 | Japan ............... C01G 49/08 |
| 5-51538 | 8/1993 | Japan ............... C01G 49/02 |
| 5-286723 | 11/1993 | Japan ............... C01G 49/08 |
| 5-333594 | 12/1993 | Japan ............... C01G 49/08 |
| 6-92642 | 4/1994 | Japan ............... C01G 49/08 |
| 6-144840 | 5/1994 | Japan ............... C01G 49/08 |
| 8-25747 | 3/1996 | Japan ............... C01G 49/08 |
| 2 068 923 | 8/1981 | United Kingdom . |

Primary Examiner—John Goodrow
Attorney, Agent, or Firm—Pillsbury Madison & Sutro LLP

[57] ABSTRACT

Magnetite particles that contain 0.1–5.0 wt % of P, 0.1–5.0 wt % of Al and optionally up to 5.0 wt % of Si on the basis of Fe, that have $\sigma_r$/SSA ratio of no more than 0.9 ($\sigma_r$, residual magnetic flux density; SSA, specific surface area) after the application of 1 kOe and that are hexahedral, octahedral or tetradecahedral in shape have a sufficiently low residual magnetic flux density that they are suitable for use as magnetic toners or resin-dispersed carriers in electrostatic copying.

12 Claims, 1 Drawing Sheet

MAGNETITE PARTICLES, A PROCESS FOR PRODUCING THEM AND APPLICATIONS THEREOF

BACKGROUND OF THE INVENTION

This invention relates to magnetite particles that have low residual magnetic flux density, are hexahedral, octahedral or tetradecahedral in shape and that are used as electrophotographic magnetic toners and resin-dispersed carriers, and as black pigments for coatings. The invention also relates to a process for producing such magnetite particles and their applications.

While various electrostatic copying systems are commercially available today, dry development is performed either by a two-component process using a toner and a carrier or by a one-component process using only a toner. Magnetite is used in most toners and carriers.

Magnetic particles for use as toners and carriers are required to have various characteristics and particularly those to be used in one-component development are required to have low residual magnetic flux density in order to attenuate the magnetic agglomeration of toner particles. As for the shape of magnetic particles, they are required to be angular as exemplified by hexahedrons in order to provide an enhanced abrasive effect on a photoreceptor to form a satisfactory latent-image. Thus, it is desired to provide magnetite particles that have low residual magnetic flux density and which are angular in shape as exemplified by hexahedrons.

Magnetite particles are known to assume a spherical, hexahedral or octahedral shape depending upon the conditions of their production, particularly the alkali/Fe ratio employed for the generation of the magnetite particles. Spherical magnetite particles generally have low residual magnetic flux density but hexahedrons and polyhedrons having more faces have increased residual magnetic flux density. For example, Japanese Patent Public Disclosure No. 201509/1991 proposed hexahedral magnetite particles but they are short of achieving the required low residual magnetic flux density. Japanese Patent Public Disclosure No. 144840/1994 proposed substantially hexahedral magnetite particles having blunt, almost planar, ridgelines and they are also short of achieving the required low residual magnetic flux density.

It has also been proposed that Si, Al and other elements be added to magnetite particles such that they have specified shapes or are improved in dispersibility and heat resistance. For example, Japanese Patent Publication No. 9045/1991 and Japanese Patent Public Disclosure No. 92642/1994 proposed that Si be added in order to produce spherical magnetite particles. Japanese Patent Public Disclosure No. 286723/1993 teaches an improvement in the dispersibility and heat resistance of magnetite particles by addition of Si and/or Al during and after the formation of magnetite particles. Further, Japanese Patent Publication No. 25747/1996 proposed that Si be allowed to be localized in magnetite particles, thereby reducing their residual magnetism and high electrical resistance. Japanese Patent Publication No. 51538/1993 discloses a high-density, unfogged toner made of octahedral magnetite particles having an uneven distribution of Si. Japanese Patent Public Disclosure No. 333594/1993 proposed that Si be localized in magnetite particles to produce a toner of high resolution and density.

Phosphorus (P) compounds are extensively used in the art of magnetic iron oxides but they have been rarely used in cubic or polyhedral magnetite particles. Conventionally, phosphorus is added to magnetic iron oxides either during the preparation of $\alpha$-FeOOH or by doping its surface. As an example of the first method, Japanese Patent Publication No. 25546/1964 uses phosphorus in order to retard the growth of crystal nuclei; further, Japanese Patent Public Disclosure No. 25202/1983 and Japanese Patent Publication No. 18766/1993 use phosphorus in order to provide an improved particle size distribution. As an example of the second method, U.S. Pat. No. 3,652,334 teaches the use of phosphorus as an anti-sinter agent in thermal conversion to $\alpha$-Fe$_2$O$_3$ and Fe$_3$O$_4$. However, all of these examples intend to ensure that the magnetic iron oxides as the final product will have improved dispersibility or that they are improved in shape anisotropy by virtue of the retention of acicularity.

Phosphorus may be added during the formation of magnetite particles, as taught in Japanese Patent Publication No. 46525/1985; however, this method is intended to produce Co-containing magnetite particles of high coercivity by addition of P together with Co.

Thus, no magnetite particles have been known in the art that contain P and Al, and optionally Si, that have low magnetic residual flux density and that are hexahedral, octahedral or tetradecahedral in shape, nor has been known a process for producing such magnetite particles.

SUMMARY OF THE INVENTION

Under these circumstances, the present inventors conducted various studies in order to provide magnetite particles that have desired magnetic characteristics for use as magnetic toners, for example, low residual magnetic flux density but not so low as to sacrifice the saturation magnetic flux density and which are angular enough to ensure the formation of an improved latent image.

Thus, according to its first aspect, the present invention provides magnetite particles that contain 0.1–5.0 wt % P and 0.1–5.0 wt % Al, and optionally up to 5.0 wt % Si, on the basis of Fe and which have a $\sigma_r$/SSA ratio of no more than 0.9 after the application of an external magnetic field of 1 kOe, with $\sigma_r$ denoting residual magnetic flux density and SSA specific surface area.

In a preferred embodiment, the magnetite particles are hexahedral, octahedral or tetradecahedral in shape.

According to its second aspect, the present invention provides a process for producing magnetite particles by reacting an aqueous ferrous salt solution with an alkali hydroxide to form ferrous hydroxide and subsequently heating it under a stream of an oxygen-containing gas, characterized in that a water-soluble phosphorus compound, a water-soluble aluminum compound and a water-soluble silicon compound are added in amounts of 0.1–5.0 wt %, 0.1–5.0 wt % and 0–5.0 wt % as P, Al and Si, respectively on the basis of Fe to either said alkali hydroxide or aqueous ferrous salt solution or the ferrous hydroxide formed by reacting said two compounds.

The magnetite particles of the invention which contain P and Al and optionally Si have such low residual magnetic flux density that they can be easily dispersed in binder resins. In addition, the particles are hexahedral, octahedral or tetradecahedral in shape and have high enough abrasive effect on a photoreceptor to form a satisfactory latent image. Hence, the magnetic particles of the invention are advantageous for use as materials for the production of magnetic toners and resin-dispersed carriers.

The expression $\sigma_r$/SSA is used to characterize the magnetite particles of the invention since the residual magnetic flux density $\sigma_r$ which increases with the specific surface area SSA is preferably compensated by SSA. The magnetite particles of the invention have $\sigma_r$/SSA value of no more than 0.9, preferably in the range of 0.5–0.9. The residual magnetic flux density $\sigma_r$ is expressed in emu/g and SSA in $m^2/g$.

As already mentioned, it is known that either spherical, hexahedral or octahedral magnetite particles are produced depending on the conditions of their synthesis, particles are produced depending on the conditions of their synthesis, particularly the alkali/Fe ratio employed during the reaction for synthesis. It has been found that not only hexahedral and octahedral magnetite particles but also tetradecahedra can be obtained by adding P and Al and optionally Si prior to the start of reaction for the synthesis. The tetradecahedral magnetite particles may be regarded as modified hexahedral or octahedral particles in which their apices have become blunt to a planar form.

The most important point of the invention is that P and Al and optionally Si be incorporated before magnetite crystals form. Even if P and Al and optionally Si are incorporated after the formation of magnetite particles, the intended magnetite particles, i.e., those which have desired magnetic characteristics for use as magnetic toners, for example, low residual magnetic flux density but not so low as to sacrifice the saturation magnetic flux density and which are hexahedral, octahedral or tetradecahedral in shape, cannot be produced.

The next important point of the invention is the incorporation of at least P and Al. If P is the sole additive, spherical particles may occasionally form. If Al is the sole additive, goethite particles will also occur during the formation of magnetite particles.

In the invention, Si may also be incorporated in order to further reduce the residual magnetic flux density.

The reason why the magnetite particles of the invention should have certain magnetic characteristics, such as low magnetic flux density but not so low as to sacrifice the saturation magnetic flux density, while assuming a hexahedral, octahedral or tetradecahedral form is not completely clear. To the best of the knowledge of the present inventors, P and Al, and optionally added Si would retard the agglomeration of magnetite particles during their growth while causing a certain effect on the growth of magnetite crystal grains such as the inhibition of the growth of a certain crystal face.

The more specific conditions for the practice of the invention will now be described. The aqueous ferrous salt solution to be used in the invention may be one of ferrous sulfate, ferrous chloride ferrous nitrate, etc. The alkali hydroxide to be used in the invention may be selected from among hydroxides of alkali metals and alkaline earth metals such as sodium hydroxide, potassium hydroxide and calcium hydroxide, as well as ammonium hydroxide and ammonia gas.

The alkali hydroxide is preferably used in 0.95–1.5 equivalents per $Fe^{2+}$ in the aqueous ferrous salt solution. Below 0.9 equivalents, the desired low residual magnetic flux density is attained but, on the other hand, spherical magnetite particles will form and the intended hexahedral, octahdedral or tetradecahedral particles are not easily obtainable. Above 1.5 equivalents, the intended magnetite particles are obtained but not by an industrially feasible method.

The reaction temperature for oxidizing ferrous hydroxide is preferably in the range of 60°–100° C. Below 60° C., the saturation magnetic flux density will decrease. Above 100° C., the intended magnetite particles are obtained but not by an industrially feasible method.

Examples of the water-soluble phosphorus compound to be used in the invention include phosphates such as sodium hexametaphosphate and ammonium primary phosphate, as well as salts of phosphoric acid and phosphorous acid. The water-soluble phosphorus compound is added in 0.1–5.0 wt %, preferably 0.1–2.0 wt %, as P with respect to Fe. Below 0.1 wt %, P is ineffective in producing magnetite particles which have the desired magnetic characteristics such as low residual magnetic flux density but not so low as to sacrifice the saturation magnetic flux density and which are hexahedral, octahedral or tetradecahedral in shape. Above 5.0 wt %, the filtrability of the magnetite particles deteriorates to an industrially infeasible low level.

The water-soluble phosphorus compound may be added into the alkali hydroxide, the ferrous salt or the ferrous hydroxide which results upon neutralization reaction of the two compounds. It should however be noted that the water-soluble phosphorus compound must at least be added before magnetite starts to crystalize.

Examples of the water-soluble aluminum compound to be used in the invention include aluminum sulfate, aluminum chloride, aluminum nitrate and sodium aluminate. The water-soluble aluminum compound is added in 0.1–5.0 wt %, preferably 0.2–2.0 wt % as Al with respect to Fe. Below 0.1 wt %, Al is ineffective in producing magnetite particles which have the desired magnetic characteristics such as low residual magnetic flux density but not so low as to sacrifice the saturation magnetic flux density and which are hexahedral, octahedral or tetradecahedral in shape. Above 5.0 wt %, the filtrability of the magnetite particles deteriorates to an industrially infeasible low level and, what is more, non-magnetite phases such as goethite will form.

The water-soluble aluminum compound may be added into the alkali hydroxide, the ferrous salt or the ferrous hydroxide which results upon neutralization reaction of the two compounds. It should, however, be noted that the water-soluble aluminum compound must at least be added before magnetite starts to crystalize.

Examples of the water-soluble silicon compound to be used in the invention include water glass, sodium silicate, potassium silicate, etc. The water-soluble silicon compound is added in 0–5.0 wt %, preferably 0–2.0 wt %, as Si with respect to Fe. Above 5.0 wt %, thixotropy will develop and the filtrability of the magnetite particles deteriorates to an industrially infeasible low level.

The water-soluble silicon compound may be added into the alkali hydroxide, the ferrous salt or the ferrous hydroxide which results upon neutralization reaction of the two compounds. It should, however, be noted that the water-soluble aluminum compound must at least be added before magnetite starts to crystalize.

While the desired magnetite particles may be produced in the manner just described above, their average size may be adjusted to range from 3 to 25 $m^2/g$ in terms of specific surface by selecting appropriate conditions. If magnetite toners are to be eventually produced, the specific surface area ranges desirably from 4 to 15 $m^2/g$. As long as P and Al and optionally Si are incorporated, the surfaces of the magnetite particles obtained may be treated with Al compounds, Si compounds, Ca compounds or organic compounds such as coupling agents in order to improve the heat resistance and dispersibility of the particles.

DESCRIPTION OF THE PREFERRED EMBODIMENTS

Figure 1:
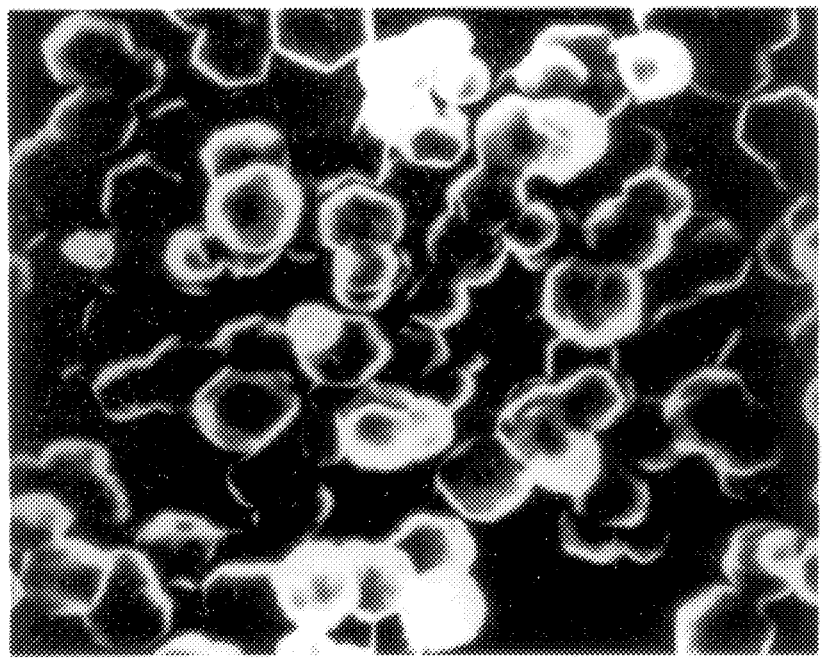
FIG. 1 is an electron micrograph (× 50,000) showing the structure of the P, Al and Si containing magnetite particle prepared in Example 1.

The following examples are provided for the purpose of further illustrating the invention but are in no way to be taken as limiting.

In the Examples and Comparative Examples that follow, various parameters were measured by the methods set forth below. For particle shape determination, the shape of the particles which accounted for at 60% of the particles examined under an electron microscope was determined as the characteristic shape of those sample particles. The specific surface area of particles was measured by the BET method. Residual magnetic flux density was measured with a vibrating-sample magnetometer (VSM=3 of Toei Kogyo Co., Ltd.) in a maximum applied field of 1 kOe. Saturation magnetic flux density was measured in a maximum applied field of 5 kOe. The P, Al and Si levels of sample particles were measured by fluorescence X-ray analysis with SIMUL-TICS (fluorescence X-ray analyzer of Rigaku Denki Co., Ltd.). The goethite level of magnetite particles was analyzed by a process comprising dispersing 2.5 g of the sample in 50 mL of 0.05 wt % sodium hexametaphosphate, further dispersing with an ultrasonic homogenizer for 20 min and analyzing the Fe level of the supernatant having goethite dispersed therein.

EXAMPLE 1

A reactor was preliminarily charged with 3.86 L of an aqueous NaOH solution (1.67 mol/L) containing 1.49 g of sodium hexametaphosphate (corresponding to 0.25 wt % as P with respect to Fe), 6.77 mL of a sodium aluminate solution (159.5 g/L) (Corresponding to 0.60 wt % as Al with respect to Fe) and 1.40 mL of a sodium silicate solution (193.3 g/L) (corresponding to 0.15 wt % as Si with respect to Fe); the reactor was further charged with 2.15 L of an aqueous ferrous sulfate solution containing 1.50 mol/L of $Fe^{2+}$, whereupon ferrous hydroxide formed (the use of sodium hydroxide corresponded to 1.04 equivalents with respect to $Fe^{2+}$).

The resulting ferrous hydroxide was heated at 90° C. under mechanical agitation with air being supplied for 120 min at a flow rate of 2 L/min, thereby producing magnetite particles. The resulting particles were washed with water, filtered, dried and comminuted by customary procedures.

Upon fluorescence X-ray analysis, the comminuted magnetite particles were found to contain P, Al and Si in respective amounts of 0.22 wt %, 0.48 wt % and 0.14 wt % of Fe; they were solely composed of a magnetite phase and had a $\sigma_r$/SSA as low as 0.62. In addition, as is clear from the electron micrograph in FIG. 1, the magnetite particles were tetradecahedral in shape and characterized by a good size distribution.

EXAMPLES 2–8

Additional samples of magnetite particles were prepared by repeating the procedure of Example 1, except that the amount of the alkali hydroxide relative to the ferrous salt, the kind of water-soluble phosphorus compound, the amount and timing of its addition, the kind of water-soluble Al compound, the amount and timing of its addition, as well as the kind of water-soluble Si compound, and the amount and timing of its addition were changed as shown in Table 1. The thus prepared magnetite particles had the characteristics shown in Table 2. Each of the magnetite particles prepared in Examples 2–8 was solely composed of a magnetite phase and they were either hexahedral, octahedral or tetradecahedral in shape, having low $\sigma_r$/SSA values in the range of 0.57–0.86.

COMPARATIVE EXAMPLE 1

A comparative sample of magnetite particles was prepared by repeating the procedure of Example 1, except that neither sodium hexametaphosphate nor sodium aluminate nor sodium silicate were added. The magnetite particles thus obtained were hexahedral in shape but they had a higher $\sigma_r$/SSA value (1.06) than the magnetite particles prepared in Example 1.

COMPARATIVE EXAMPLE 2

An additional comparative sample of magnetite particles was prepared by repeating the procedure of Example 4, except that neither sodium hexametaphosphate nor sodium aluminate nor sodium silicate were added. The magnetite particles thus obtained were octahedral in shape but they had a higher $\sigma_r$/SSA value (1.67) than the magnetite particles prepared in Example 4.

COMPARATIVE EXAMPLES 3–7

Additional comparative samples of magnetite particles were prepared by repeating the procedure of Example 1, except that the amounts of addition of the water-soluble P, Al and Si compounds were respectively changed as shown in Table 1. The thus prepared magnetite particles had the characteristics shown in Table 2.

The magnetite particles prepared in Comparative Example 3 had a low $\sigma_r$/SSA value of 0.68 but they were spherical in shape. The magnetite particles prepared in Comparative Examples 4 and 6 had goethite forned in addition to magnetite. The magnetite particles prepared in Comparative Example 5 were spherical in shape and had a high $\sigma_r$/SSA value of 0.99. The magnetite particles prepared in Comparative Example 7 were octahedral in shape but they had a high $\sigma_r$/SSA value of 1.23.

COMPARATIVE EXAMPLE 8

To the magnetite particles prepared in Comparative Example 1, 1.49 g of sodium hexametaphosphate (corresponding to 0.25 wt % as P with respect to Fe), 6.77 mL of a sodium aluminate solution (159.5 g/L) (corresponding to 0.60 wt % as Al with respect to Fe) and 1.40 mL of a sodium silicate solution (193.3 g/L) (corresponding to 0.15 wt % as Si with respect to Fe) and the mixture was washed with water, filtered, dried and comminuted by customary procedures. Upon fluorescence X-ray analysis, the comminuted magnetite particles were found to contain P, Al and Si in respective amounts of 0.22 wt %, 0.48 wt % and 0.14 wt % of Fe; however, they had a high $\sigma_r$/SSA value of 1.04.

TABLE 1

Production of Magnetite Particles

| Run NO. | Alkali addition (in equivalents relative to total Fe$^{2+}$) | Water-soluble P compound name | P/Fe, wt % | timing of addition * | Water-soluble Al compound name | Al/Fe, wt % | timing of addition * | Water-soluble Si compound name | Si/Fe, wt % | timing of addition * |
|---|---|---|---|---|---|---|---|---|---|---|
| Ex. 1 | 1.04 | sodium hexa-metaphosphate | 0.25 | A | sodium aluminate | 0.60 | A | sodium silicate | 0.15 | A |
| Ex. 2 | 1.04 | ammonium primary phosphate | 0.25 | B | aluminum sulfate | 0.60 | B | sodium silicate | 0.15 | B |
| Ex. 3 | 1.02 | sodium hexa-metaphosphate | 0.25 | C | sodium aluminate | 0.60 | C | sodium silicate | 0.15 | C |
| Ex. 4 | 1.15 | sodium hexa-metaphosphate | 0.25 | A | sodium aluminate | 0.60 | A | sodium silicate | 0.15 | A |
| Ex. 5 | 1.04 | sodium hexa-metaphosphate | 0.50 | A | sodium aluminate | 0.60 | A | sodium silicate | 0.15 | A |
| Ex. 6 | 1.04 | sodium hexa-metaphosphate | 0.25 | A | sodium aluminate | 1.20 | A | sodium silicate | 0.15 | A |
| Ex. 7 | 1.04 | sodium hexa-metaphosphate | 0.25 | A | sodium aluminate | 0.60 | A | sodium silicate | 0.00 | A |
| Ex. 8 | 1.04 | sodium hexa-metaphosphate | 0.50 | A | sodium aluminate | 0.60 | A | sodium silicate | 0.25 | A |
| Comp. Ex. 1 | 1.04 | — | — | — | — | — | — | — | — | — |
| Comp. Ex. 2 | 1.15 | — | — | — | — | — | — | — | — | — |
| Comp. Ex. 3 | 1.04 | sodium hexa-metaphosphate | 0.25 | A | — | — | — | — | — | — |
| Comp. Ex. 4 | 1.04 | — | — | — | sodium aluminate | 0.60 | A | — | — | — |
| Comp. Ex. 5 | 1.04 | — | — | — | — | — | — | sodium silicate | 0.15 | A |
| Comp. Ex. 6 | 1.04 | — | — | — | sodium aluminate | 0.60 | A | sodium silicate | 0.15 | A |
| Comp. Ex. 7 | 1.04 | sodium hexa-metaphosphate | 0.25 | A | — | — | — | sodium silicate | 0.15 | A |
| Comp. Ex. 8 | 1.04 | sodium hexa-metaphosphate | 0.25 | D | sodium aluminate | 0.60 | D | sodium silicate | 0.15 | D |

* A: added to alkali hydroxide
B: added to aqueous ferrous sulfate solution
C: added to aqueous ferrous hydroxide solution
D: added after formation of magnetite particles

TABLE 2

Characteristics of Magnetite particles

| Run No. | Shape | Goethite formation wt % | SSA by BET, m$^2$/g | $\sigma_r$*, emu/g | $\sigma_s$**, emu/g | P/Fe, wt % | Al/Fe, wt % | Si/Fe, wt % | $\sigma_r$/SSA — |
|---|---|---|---|---|---|---|---|---|---|
| Ex. 1 | tetradecahedral | 0 | 10.0 | 6.2 | 83.4 | 0.22 | 0.48 | 0.14 | 0.62 |
| Ex. 2 | tetradecahedral | 0 | 10.2 | 5.9 | 82.5 | 0.22 | 0.48 | 0.14 | 0.58 |
| Ex. 3 | hexahedral | 0 | 9.5 | 6.0 | 83.7 | 0.22 | 0.48 | 0.13 | 0.63 |
| Ex. 4 | octahdedral | 0 | 8.5 | 7.3 | 82.4 | 0.21 | 0.46 | 0.14 | 0.86 |
| Ex. 5 | tetradecahedral | 0 | 9.4 | 6.2 | 81.9 | 0.44 | 0.48 | 0.14 | 0.65 |
| Ex. 6 | tetradecahedral | 0 | 10.5 | 7.5 | 80.7 | 0.22 | 1.08 | 0.14 | 0.71 |
| Ex. 7 | tetradecahedral | 0 | 10.4 | 6.5 | 83.1 | 0.22 | 0.48 | 0.00 | 0.63 |
| Ex. 8 | tetradecahedral | 0 | 10.2 | 5.9 | 82.5 | 0.22 | 0.48 | 0.24 | 0.57 |
| Comp. Ex. 1 | hexahedral | 0 | 9.4 | 10.0 | 85.7 | 0.00 | 0.00 | 0.00 | 1.06 |
| Comp. Ex. 2 | octahdedral | 0 | 4.3 | 7.2 | 87.2 | 0.00 | 0.00 | 0.00 | 1.67 |
| Comp. Ex. 3 | spherical | 0 | 8.3 | 4.2 | 86.2 | 0.22 | 0.00 | 0.00 | 0.5 |
| Comp. Ex. 4 | hexahedral | 1.7 | 10.0 | 6.8 | 84.3 | 0.00 | 0.48 | 0.00 | — |
| Comp. Ex. 5 | spherical | 0 | 9.0 | 8.9 | 86.0 | 0.00 | 0.00 | 0.14 | 0.99 |
| Comp. Ex. 6 | hexahedral | 1.1 | 8.8 | 6.2 | 64.4 | 0.00 | 0.48 | 0.14 | — |
| Comp. Ex. 7 | octahdedral | 0 | 4.6 | 5.7 | 87.3 | 0.22 | 0.00 | 0.14 | 1.23 |
| Comp. Ex. 8 | hexahedral | 0 | 9.5 | 9.9 | 83.2 | 0.22 | 0.48 | 0.14 | 1.04 |

*) Residual flux density measured in external field of 1 kOe.
**) Saturation flux density measured in external field of 5 kOe.

What is claimed is:

1. Magnetite particles comprising 0.1–5.0 wt % P and 0.1–5.0 wt % Al on the basis of Fe and which have a $\sigma_r$/SSA ratio of no more than 0.9 after the application of an external magnetic field of 1 kOe, with $\sigma_r$ denoting residual magnetic flux density and SSA specific surface area, wherein the P and Al are within the magnetite particles.

2. The magnetite particles of claim 1 which further comprise up to 5.0 wt % Si on the basis of Fe, wherein the Si is within the magnetite particles.

3. The magnetite particles of claim 1 which are hexahedral, octahedral or tetradecahedral in shape.

4. The magnetite particles of claim 1, wherein said $\sigma_r$/SSA ratio is 0.5–0.9.

5. A process for producing magnetite particles by reacting an aqueous ferrous salt solution with an alkali hydroxide to form ferrous hydroxide and subsequently heating it under a stream of an oxygen-containing gas, wherein a water-soluble phosphorus compound and a water-soluble aluminum compound are added in amounts of 0.1–5.0 wt % and 0.1–5.0 wt % as P and Al, respectively, on the basis of Fe to either said alkali hydroxide or aqueous ferrous salt solution or the ferrous hydroxide formed by reacting said two compounds.

6. The process of claim 5, wherein a water-soluble silicon compound is also added in an amount of up to 5.0 wt % as Si on the basis of Fe to either said alkali hydroxide or aqueous ferrous salt solution or the formed by reacting said two compounds.

7. The process of claim 5, wherein the amount of the alkali hydroxide relative to said ferrous salt is 0.95–1.5 equivalents with respect to $Fe^{2+}$ in said aqueous ferrous salt solution.

8. The process of claim 5, wherein said water-soluble phosphorus compound is added in an amount of 0.1–2.0 wt % as P with respect to Fe.

9. The process of claim 5, wherein said water-soluble aluminum compound is added in an amount of 0.2–2.0 wt % as Al with respect to Fe.

10. The process of claim 6, wherein said water-soluble silicon compound is added in an amount of up to 2.0 wt % as Si with respect to Fe.

11. An electrophotographic magnetic toner comprising magnetite particles that comprise 0.1–5.0 wt % P and 0.1–5.0 wt % Al on the basis of Fe and which have a $\sigma_r$/SSA ratio of no more than 0.9 after the application of an external magnetic field of 1 kOe, with $\sigma_r$ denoting residual magnetic flux density and SSA specific surface area, wherein the P and Al are within the magnetite particles.

12. A resin-dispersed carrier comprising magnetite particles that comprise 0.1–5.0 wt % P and 0.1–5.0 wt % Al on the basis of Fe and which have a $\sigma_r$/SSA ratio of no more than 0.9 after the application of an external magnetic field of 1 kOe, with $\sigma_r$ denoting residual magnetic flux density and SSA specific surface area, wherein the P and Al are within the magnetite particles.

* * * * *